May 8, 1962     C. BAUR ETAL     3,033,081
PHOTOGRAPHIC TELE-OBJECTIVE
Filed Oct. 28, 1958
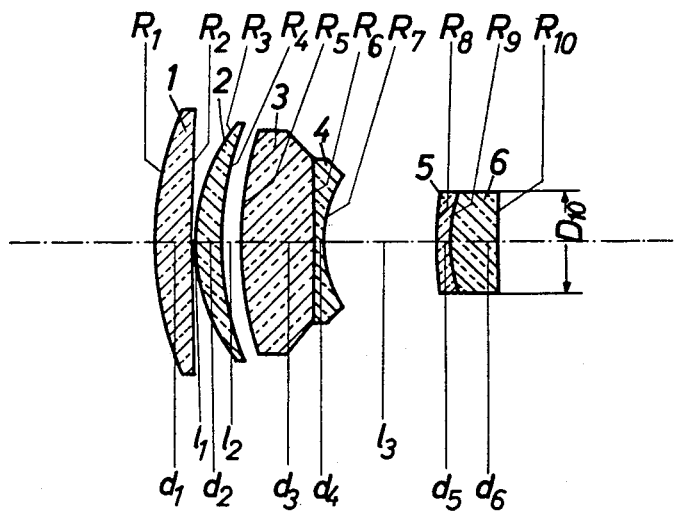
INVENTOR.
CARL BAUR
BY CHRISTIAN OTZEN

United States Patent Office 3,033,081
Patented May 8, 1962

3,033,081
PHOTOGRAPHIC TELE-OBJECTIVE
Carl Baur, Munich-Baldham, and Christian Otzen, Munich, Germany, assignors to Agfa Aktiengesellschaft, Munich, Germany
Filed Oct. 28, 1958, Ser. No. 770,167
Claims priority, application Germany Nov. 5, 1957
10 Claims. (Cl. 88—57)

The present invention relates to a photographic tele-objective and more particularly to a high-power photographic tele-objective which comprises four meniscus members which are spaced from each other by air spaces.

It is characteristic for tele-objectives that the sum of the rear intercept length and of the total length of the objective is smaller than the focal length of the objective so that the rear principal point of the optical system is located forwardly of the rearmost lens vertex. The known tele-objectives all include a rearwardly located lens member of negative power of refraction. The negative rear member effects a location of the rear principal point forwardly of the lens vertex of the rear member of the objective whereby the objective becomes a tele-objective.

It is one object of the present invention to improve the known tele-objectives, and to provide a photographic tele-objective of high power.

Another object of the present invention is to provide a photographic tele-objective in which coma, chromatic aberration, astigmatism, spherical aberration, and distortion are fully corrected.

In accordance with the present invention, the rearmost lens member of the objective is positive and converging, contrary to the known tele-objective in which the rear member is negative. In accordance with the present invention, the lens member which is located forwardly of the rear lens member and is spaced from the same by a great air space, is made with a far higher negative power of refraction as compared with the known tele-objectives. The cooperation of the opposite powers of refraction of these two members effects a placement of the rear principal point of the objective forwardly of the lens vertex of the rearmost lens member, if the air space between the two lens members is suitably designed.

In order to reduce distortion, and chromatic aberration, and furthermore in order to obtain the smallest possible diameter of the rear face of the rear member of the objective, it is advantageous to provide as a rear member a positive meniscus having a rear face concave to the rear. The tele-objective according to the present invention includes four meniscus members whose outer surfaces are so designed that they are concave to the rear.

The photographic tele-objective according to the present invention comprises four meniscus members spaced by air spaces, the first and second meniscus members in order from the front to the rear being converging, the third meniscus member being diverging and of high negative power of refraction, and the fourth meniscus member being converging and of low positive power of refraction so that the rear principal point of the objective is located forwardly of the rear vertex of the fourth meniscus member.

In the preferred embodiment of the present invention, the first and second meniscus members are singlets, and the third and fourth meniscus members are doublets. The concave faces of at least the fourth meniscus member are concave to the rear. The third meniscus member and the fourth meniscus member are spaced from each other an air space greater than the air space between the first, second and third meniscus members.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing, whose single FIGURE is a side view of a tele-objective according to a preferred embodiment of the present invention.

Referring now to the drawing it will be seen that four meniscus members are provided. The meniscus member 1 in order from the front to the rear is a singlet having an axial thickness $d_1$, and the second meniscus member 2 is also a singlet having an axial thickness $d_2$. Meniscus members 1 and 2 are separated by an axial air space $l_1$.

The front face of meniscus 1 has the radius of curvature $R_1$ and the rear face of meniscus 1 has the radius of curvature $R_2$. The front face of meniscus 2 has a radius of curvature $R_3$ and the rear face of meniscus 3 has a radius of curvature $R_4$.

The third meniscus member is a cemented doublet consisting of a converging lens element 3, and of a diverging lens element 4. An air space $l_2$ separates meniscus 2 from lens element 3. Lens element 3 has an axial thickness $d_3$, and lens element 4 has an axial thickness $d_4$. The front face of lens element 3 has the radius of curvature $R_5$, the cemented interfaces of lens elements 3 and 4 have a radius of curvature $R_6$, and the rear face of lens element 4 has a radius of curvature $R_7$.

The fourth meniscus member constitutes the rear member of the objective, and consists of a diverging lens element 5, and a converging lens element 6. The axial thickness of lens element 5 is $d_5$, and the axial thickness of lens element 6 is $d_6$. An air space $l_3$, which is greater than air space $l_1$ or air space $l_2$, separates lens elements 4 and 5. The front face of lens element 5 has a radius of curvature $R_8$, the cemented interfaces of lens elements 5 and 6 have a radius of curvature $R_9$, and the rear face of lens element 6 has a radius of curvature $R_{10}$ and is concave to the rear.

In order to correct coma and astigmatism in tele-objectives according to the present invention which have an aperture of 1:2, or 1:2.8 with angle of field of 20° and 30° respectively, the radius of curvature of the rear face of lens element 4 is greater than 0.25 times, and smaller than 0.5 times the total axial length of the objective, which may be mathematically expressed as follows:

$$R_7 > 0.25(d_1+d_2+d_3+d_4+d_5+d_6+l_1+l_2+l_3) \quad (1)$$
$$R_7 < 0.5(d_1+d_2+d_3+d_4+d_5+d_6+l_1+l_2+l_3) \quad (2)$$

Furthermore, the radius of curvature $R_5$ of the front face of lens element 3 is greater than 2.5 times and smaller than four times the radius of curvature $R_7$ of the rear face of lens element 4, which may be mathematically expressed as follows:

$$2.5R_7 < R_5 < 4R_7 \quad (3)$$

The absolute value of the radius of curvature $R_6$ of the cemented interfaces of lens elements 3 and 4 is greater than eight times the radius of curvature $R_7$ of the rear face of lens element 4, and smaller than eight times the radius of curvature $R_5$ of the front face of lens element 3 which may be mathematically expressed as follows:

$$8R_7 < |R_6| < 8R_5 \quad (4)$$

The sum of the axial thicknesses $d_3$ and $d_4$ of lens elements 3 and 4 is greater than one tenth of the focal length of the objective, and smaller than two tenths of the focal length of the objective, which may be mathematically expressed as follows:

$$0.10f < (d_3+d_4) < 0.20f \quad (5)$$

In order to obtain the best correction of the spherical and astigmatic aberrations, the axial air space $l_3$ between lens elements 4 and 5 is greater than 17%, and smaller than 25% of the focal length of the objective as a whole, which may be mathematically expressed as follows:

$$0.17f < l_3 < 0.25f \quad (6)$$

The picture quality is further improved with regard to astigmatism and coma if one-sixth of the sum of the radii of curvature $R_1$, $R_5$, and $R_8$ of lens elements 1, 3 and 5, respectively is greater than the sum of, and smaller than the difference between the radius of curvature $R_3$ of the front face of lens element 2 and five-hundredths of the focal length $f$ of the objective as whole which may be mathematically expressed as follows:

$$\frac{R_1+R_5+R_8}{6} < R_3 + 0.05f \quad (7)$$

$$\frac{R_1+R_5+R_8}{6} > R_3 - 0.05f \quad (8)$$

The correction of the objective is further improved if the sum of the axial thicknesses $d_5$ and $d_6$ of lens elements 5 and 6 is greater than the axial thickness $d_1$ of lens element 1, but smaller than one-fifth of the focal length of the objective, which may be mathematically expressed as follows:

$$d_1 < (d_5+d_6) < 0.20f \quad (9)$$

A particular advantage of the present invention is the small diameter of the lens elements 5 and 6, while full marginal brightness is maintained. The diameter $D_{10}$ of lens elements 5 and 6 is less than one-fifth of the focal length of the objective, which may be mathematically expressed as follows:

$$D_{10} < 0.20f \quad (10)$$

Also, the rear intercept length $s_0'$ can be made less than 36% of the focal length of the objective, which may be mathematically expressed as follows:

$$s_0' < 0.36f \quad (11)$$

The small diameter of the rear meniscus 5, 6 of the objective and the small rear intercept length of the objective are particularly important for the use of high-power tele-objectives according to the present invention for photographic cameras which have a central shutter arranged between the rear meniscus 5, 6 and the picture frame.

A high-power tele-objective according to the present invention can be used for all types of cameras including cameras provided with curtain shutter, or iris diaphragm shutter, but does not require expensive glass of high refractive power. At the same time, spherical, chromatic, and astigmatic aberrations, and coma are uniformly corrected to such an extent that the high picture quality of the objective at an aperture of 1:2, 1:2.8, can be hardly improved by reducing the aperture.

The following examples are illustrative for tele-objectives according to the present invention:

*Example 1*

The aperture is 1:2, the angle of field is 20°, and the rear intercept length is 0.31813 for a focal length $f$ of 1.000.

TABLE I

| Lens Elements | Radii | Thickness and Air-spaces | $n_D$ | $v$ |
|---|---|---|---|---|
| 1 | $R_1 = +0.61183f$ | $d_1 = 0.07492f$ | $n_1 = 1.62041$ | $v_1 = 60.3$ |
|   | $R_2 = +7.46413f$ | $l_1 = 0.00085f$ |   |   |
| 2 | $R_3 = +0.34634f$ | $d_2 = 0.05623f$ | $n_2 = 1.62041$ | $v_2 = 60.3$ |
|   | $R_4 = +0.65803f$ | $l_2 = 0.04023f$ |   |   |
| 3 | $R_5 = +0.70437f$ | $d_3 = 0.14808f$ | $n_3 = 1.51009$ | $v_3 = 63.4$ |
| 4 | $R_6 = -2.51018f$ | $d_4 = 0.01339f$ | $n_4 = 1.72825$ | $v_4 = 28.3$ |
|   | $R_7 = +0.22914f$ | $l_3 = 0.22123f$ |   |   |
|   | $R_8 = +0.72151f$ |   |   |   |
| 5 | $R_9 = +0.29815f$ | $d_5 = 0.02677f$ | $n_5 = 1.72340$ | $v_5 = 38.0$ |
| 6 | $R_{10} = +4.53777f$ | $d_6 = 0.08923f$ | $n_6 = 1.72825$ | $v_6 = 28.3$ |

In the above table $n_D$ is the index of refraction for the D line of the spectrum having wave length of 587.6 m$\mu$, and small $v$ is the dispersive index. The powers of refraction of the lens elements are given in the following table wherein the faces of the lens elements are identified by subscripts referring to the radii of curvature associated with the respective lens faces.

TABLE II

| Lens Elements | Powers of Refraction ($P_1$ to $P_{10}$) |
|---|---|
| 1 | Surface ($R_1$) $P_1 = +1.01402/f$ |
|   | Surface ($R_2$) $P_2 = -0.08312/f$ |
| 2 | Surface ($R_3$) $P_3 = +1.79133/f$ |
|   | Surface ($R_4$) $P_4 = -0.94283/f$ |
| 3 | Surface ($R_5$) $P_5 = +0.72418/f$ |
| 4 | Surface ($R_6$) $P_6 = -0.08691/f$ |
|   | Surface ($R_7$) $P_7 = -3.17819/f$ |
| 5 | Surface ($R_8$) $P_8 = +1.00262/f$ |
| 6 | Surface ($R_9$) $P_9 = +0.01627/f$ |
|   | Surface ($R_{10}$) $P_{10} = -0.16049/f$ |

*Example II*

The aperture of the objective is 1:2.8, the angle of field is 30°, and the rear intercept length is 0.34522 for a focal length $f$ of 1.000.

TABLE III

| Lens Elements | Radii | Thickness and Air-spaces | $n_D$ | $v$ |
|---|---|---|---|---|
| 1 | $R_1 = +0.60920f$ | $d_1 = 0.07246f$ | $n_1 = 1.62041$ | $v_1 = 60.3$ |
|   | $R_2 = +5.99959f$ | $l_1 = 0.00082f$ |   |   |
| 2 | $R_3 = +0.33517f$ | $d_2 = 0.05438f$ | $n_2 = 1.62041$ | $v_2 = 60.3$ |
|   | $R_4 = +0.63881f$ | $l_2 = 0.03891f$ |   |   |
| 3 | $R_5 = +0.68151f$ | $d_3 = 0.14321f$ | $n_3 = 1.51009$ | $v_3 = 63.4$ |
| 4 | $R_6 = -2.42845f$ | $d_4 = 0.01294f$ | $n_4 = 1.72825$ | $v_4 = 28.3$ |
|   | $R_7 = +0.22177f$ | $l_3 = 0.21396f$ |   |   |
|   | $R_8 = +0.69730f$ |   |   |   |
| 5 | $R_9 = +0.36838f$ | $d_5 = 0.02589f$ | $n_5 = 1.72340$ | $v_5 = 38.0$ |
| 6 | $R_{10} = +6.24337f$ | $d_6 = 0.08630f$ | $n_6 = 1.72825$ | $v_6 = 28.3$ |

*Example IV*

The aperture is 1:2.8, the angle of field is 30° and the rear intercept length is 0.35485 for a focal length $f$ of 1.000.

TABLE IV

| Lens Elements | Radii | Thickness and Air-spaces | $n_D$ | V |
|---|---|---|---|---|
| 1 | $R_1 = +0.60000f$ | $d_1 = 0.07225f$ | $n_1 = 1.62041$ | $v_1 = 60.3$ |
|   | $R_2 = +4.86946f$ | $l_1 = 0.00080f$ |   |   |
| 2 | $R_3 = +0.33332f$ | $d_2 = 0.05812f$ | $n_2 = 1.62041$ | $v_2 = 60.3$ |
|   | $R_4 = +0.62893f$ | $l_2 = 0.03492f$ |   |   |
| 3 | $R_5 = +0.66990f$ | $d_3 = 0.14289f$ | $n_3 = 1.50378$ | $v_3 = 66.7$ |
| 4 | $R_6 = -2.37005f$ | $d_4 = 0.01298f$ | $n_4 = 1.71736$ | $v_4 = 29.5$ |
|   | $R_7 = +0.21728f$ | $l_3 = 0.21341f$ |   |   |
| 5 | $R_8 = +0.66498f$ | $d_5 = 0.02584f$ | $n_5 = 1.71020$ | $v_5 = 36.5$ |
| 6 | $R_9 = +0.45206f$ | $d_6 = 0.07466f$ | $n_6 = 1.72825$ | $v_6 = 28.3$ |
|   | $R_{10} = +4.72522f$ |   |   |   |

It will be understood that each of the elements described above, or two or more together, may also find a useful application in other types of tele-objectives differing from the types described above.

While the invention has been illustrated and described as embodied in a tele-objective of high power of refraction having a positive rear member, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Photographic tele-objective comprising, four meniscus members spaced by air spaces, the first and second meniscus members in order from the front to the rear being positive singlets, the third meniscus member in said order being a diverging doublet consisting of a converging lens element and of a diverging lens element having cemented interfaces, and the fourth meniscus member being converging and spaced from said third meniscus member an air space greater than each of the air spaces between said first, second, and third meniscus member, said fourth meniscus member having a rear face concave to the rear; the radius of curvature of the rear face of said third meniscus member being greater than 0.25 times and smaller than 0.5 times the sum of all axial thicknesses of said meniscus members and of all axial air spaces between said meniscus members; the radius of curvature of the front face of said third meniscus member being greater than 2.5 times and smaller than four times the radius of curvature of the rear face of said third meniscus member; the absolute value of the radius of curvature of the cemented interfaces of said third meniscus member being greater than eight times the radius of curvature of the rear face of said third meniscus member and smaller than eight times the radius of curvature of the front face of said third meniscus member; one-sixth of the sum of the radii of curvature of the front faces of said first meniscus member, second meniscus member and fourth meniscus member being greater than the sum of, and smaller than the difference between the radius of curvature of the front face of said second meniscus member and 0.05 times the focal length of the objective as a whole; the axial air space between said third meniscus member and said fourth meniscus member being greater than 0.17 times and smaller than 0.25 times the focal length of the objective as a whole; and the sum of the axial thicknesses of said lens elements of said third meniscus member being greater than 0.10 times and smaller than 0.20 times the focal length of the objective as a whole.

2. Photographic tele-objective comprising, four meniscus members spaced by air spaces, the first and second meniscus members in order from the front to the rear being positive singlets, the third meniscus member in said order being a diverging doublet consisting of a converging lens element and of a diverging lens element having cemented interfaces, and the fourth meniscus member being converging and spaced from said third meniscus member an air space greater than each of the air spaces between said first, second, and third meniscus members, said fourth meniscus member having a rear face concave to the rear; the radius of curvature of the rear face of said third meniscus member being greater than 0.25 times and smaller than 0.5 times the sum of all axial thicknesses of said meniscus members and of all axial air spaces between said meniscus members; the radius of curvature of the front face of said third meniscus member being greater than 2.5 times and smaller than four times the radius of curvature of the rear face of said third meniscus member; the absolute value of the radius of curvature of the cemented interfaces of said third meniscus member being greater than eight times the radius of curvature of the rear face of said third meniscus member and smaller than eight times the radius of curvature of the front face of said third meniscus member; the axial thickness of said fourth meniscus member being greater than the axial thickness of said first meniscus member and smaller than 0.20 times the focal length of the objective as a whole; and the sum of the axial thicknesses of said lens elements of said third meniscus member being greater than 0.10 times and smaller than 0.20 times the focal length of the objective as a whole.

3. Photographic tele-objective comprising, four meniscus members spaced by air spaces, the first and second meniscus members in order from the front to the rear being positive singlets, the third meniscus member in said order being a diverging doublet consisting of a converging lens element and of a diverging lens element having cemented interfaces, and the fourth meniscus member being converging and spaced from said third meniscus member an air space greater than each of the air spaces between said first, second, and third meniscus members, said fourth meniscus member having a rear face concave to the rear; the radius of curvature of the rear face of said third meniscus member being greater than 0.25 times and smaller than 0.5 times the sum of all axial thicknesses of said meniscus members and of all axial air spaces between said meniscus members; the radius of curvature of the front face of said third meniscus member being greater than 2.5 times and smaller than four times the radius of curvature of the rear face of said third meniscus member; the absolute value of the radius of curvature of the cemented interfaces of said third meniscus member being greater than eight times the radius of curvature of the rear face of said third meniscus member and smaller than eight times the radius of curvature of the front face of said third meniscus member; one-sixth of the sum of the radii of curvature of the front faces of said first meniscus member, second meniscus member and fourth meniscus member being greater than the sum of, and smaller than the difference between the radius of curvature of the front face of said second meniscus member and 0.05 times the focal length of the objective as a whole; the axial air space between said third meniscus member and said fourth meniscus member being greater than 0.17 times and smaller than 0.25 times the focal length of the objective as a whole; the axial thickness of said fourth meniscus member being greater than the axial thickness of said first meniscus member and smaller than 0.20 times the focal length of the objective as a whole; and the sum of the axial thicknesses of said lens elements of said third meniscus member being greater than 0.10 times and smaller than 0.20 times the focal length of the objective as a whole.

4. Photographic tele-objective comprising, four meniscus members spaced by air spaces, the first and second meniscus members in order from the front to the rear being positive singlets, the third meniscus member in said order being a diverging doublet consisting of a converging lens element and of a diverging lens element having cemented interfaces, and the fourth meniscus member being a converging doublet consisting of a converging lens element and of a diverging lens element having cemented interfaces, said fourth meniscus member being spaced from said third meniscus member an air space greater than each of the air spaces between said first, second, and third meniscus members, the concave faces of said lens elements of said fourth meniscus member being concave to the rear; the radius of curvature of the rear face of said third meniscus member being greater than 0.25 times and smaller than 0.5 times the sum of all axial thicknesses of said meniscus members and of all axial air spaces between said meniscus members; the radius of curvature of the front face of said third meniscus member being greater than 2.5 times and smaller than four times the radius of curvature of the rear face of said third meniscus member; the absolute value of the radius of curvature of the cemented interfaces of said third meniscus member being greater than eight times the radius of curvature of the rear face of said third meniscus member and smaller than eight times the radius of curvature of the front face of said third meniscus member; and the sum of the axial thicknesses of said lens elements of said third meniscus member being greater than 0.10 times and smaller than 0.20 times the focal length of the objective as a whole.

5. Photographic tele-objective comprising, four meniscus members spaced by air spaces, the first and second meniscus members in order from the front to the rear being positive singlets, the third meniscus member in said order being a diverging doublet consisting of a converging lens element and of a diverging lens element having cemented interfaces, and the fourth meniscus member being a converging doublet consisting of a converging lens element and of a diverging lens element having cemented interfaces, said fourth meniscus member being spaced from said third meniscus member an air space greater than each of the air spaces between said first, second, and third meniscus members, the concave faces of said lens elements of said fourth meniscus member being concave to the rear; the radius of curvature of the rear face of said third meniscus member being greater than 0.25 times and smaller than 0.5 times the sum of all axial thicknesses of said meniscus members and of all axial air spaces between said meniscus members; the radius of curvature of the front face of said third meniscus member being greater than 2.5 times and smaller than four times the radius of curvature of the rear face of said third meniscus member; the absolute value of the radius of curvature of the cemented interfaces of said third meniscus member being greater than eight times the radius of curvature of the rear face of said third meniscus member and smaller than eight times the radius of curvature of the front face of said third meniscus member; one-sixth of the sum of the radii of curvature of the front faces of said first meniscus member, second meniscus member and fourth meniscus member being greater than the sum of, and smaller than the difference between the radius of curvature of the front face of said second meniscus member and 0.05 times the focal length of the objective as a whole; the axial air space between said third meniscus member and said fourth meniscus member being greater than 0.17 times and smaller than 0.25 times the focal length of the objective as a whole; and the sum of the axial thicknesses of said lens elements of said third meniscus member being greater than 0.10 times and smaller than 0.20 times the focal length of the objective as a whole.

6. Photographic tele-objective comprising, four meniscus members spaced by air spaces, the first and second meniscus members in order from the front to the rear being positive singlets, the third meniscus member in said order being a diverging doublet consisting of a converging lens element and of a diverging lens element having cemented interfaces, and the fourth meniscus member being a converging doublet consisting of a converging lens element and of a diverging lens element having cemented interfaces, said fourth meniscus member being spaced from said third meniscus member an air space greater than each of the air spaces between said first, second, and third meniscus members, the concave faces of said lens elements of said fourth meniscus member being concave to the rear; the radius of curvature of the rear face of said third meniscus member being greater than 0.25 times and smaller than 0.5 times the sum of all axial thicknesses of said meniscus members and of all axial air spaces between said meniscus members; the radius of curvature of the front face of said third meniscus member being greater than 2.5 times and smaller than four times the radius of curvature of the rear face of said third meniscus member; the absolute value of the radius of curvature of the cemented interfaces of said third meniscus member being greater than eight times the radius of curvature of the rear face of said third meniscus member and smaller than eight times the radius of curvature of the front face of said third meniscus member; the sum of the axial thicknesses of said lens elements of said fourth meniscus member being greater than the axial thickness of said first meniscus member and smaller than 0.20 times the focal length of the objective as a whole; and the sum of the axial thicknesses of said lens elements of said third meniscus member being greater than 0.10 times and smaller than 0.20 times the focal length of the objective as a whole.

7. A photographic tele-objective having an aperture of 1:2, an angle of field of 20° and a rear intercept length of $0.31813f$, the objective being constructed substantially according to the specifications in the following table:

| Lens Elements | Radii | Thicknesses and Airspaces | $n_D$ | V |
|---|---|---|---|---|
| 1 | $R_1=+0.61183f$ | $d_1=0.07492f$ | $n_1=1.62041$ | $v_1=60.3$ |
|   | $R_2=+7.46413f$ | $l_1=0.00085f$ |   |   |
| 2 | $R_3=+0.34634f$ | $d_2=1.51009f$ | $n_2=1.62041$ | $v_2=60.3$ |
|   | $R_4=+0.65803f$ | $l_2=0.04023f$ |   |   |
| 3 | $R_5=+0.70437f$ | $d_3=0.14808f$ | $n_3=1.51009$ | $v_3=63.4$ |
|   | $R_6=-2.51018f$ |   |   |   |
| 4 | $R_7=+0.22914f$ | $d_4=0.01339f$ | $n_4=1.72825$ | $v_4=28.3$ |
|   |   | $l_3=0.22123f$ |   |   |
| 5 | $R_8=+0.72151f$ | $d_5=0.02677f$ | $n_5=1.72340$ | $v_5=38.0$ |
|   | $R_9=+0.29815f$ |   |   |   |
| 6 | $R_{10}=+4.53777f$ | $d_6=0.08923f$ | $n_6=1.72825$ | $v_6=28.3$ | wherein the first column lists six lens elements in numerals in order from the front to the rear; wherein $f$ is the focal length of the objective, $n_D$ is the index of refraction for the D line of the spectrum and $v$ is the dispersive index; and wherein R, d, and l refer, respectively, to the radii of curvature of the refractive faces, the axial thicknesses of the lens elements, and the axial air spaces between the lens elements, the subscripts on the characters R, d, l, n and v being numbered consecutively from the front to the rear, and the plus and minus signs in the second column corresponding to refractive lens faces which are respectively convex and concave to the front.

8. A photographic tele-objective having an aperture of 1:2, an angle of field of 20° and a rear intercept length of 0.31813f, the objective being constructed substantially according to the specifications in the following table:

| Lens Elements | Radii | Thicknesses and Airspaces | $n_D$ | V |
|---|---|---|---|---|
| 1 | $R_1=+0.61183f$ | $d_1=0.07492f$ | $n_1=1.62041$ | $v_1=60.3$ |
|   | $R_2=+7.46413f$ | $l_1=0.00085f$ |   |   |
| 2 | $R_3=+0.34634f$ | $d_2=0.05623f$ | $n_2=1.62041$ | $v_2=60.3$ |
|   | $R_4=+0.65803f$ | $l_2=0.04023f$ |   |   |
| 3 | $R_5=+0.70437f$ | $d_3=0.14808f$ | $n_3=1.51009$ | $v_3=63.4$ |
| 4 | $R_6=-2.51018f$ | $d_4=0.01339f$ | $n_4=1.72825$ | $v_4=28.3$ |
|   | $R_7=+0.22914f$ | $l_3=0.22123f$ |   |   |
| 5 | $R_8=+0.72151f$ | $d_5=0.02677f$ | $n_5=1.72340$ | $v_5=38.0$ |
|   | $R_9=+0.29815f$ | $d_6=0.08923f$ | $n_6=1.72825$ | $v_6=28.3$ |
| 6 | $R_{10}=+4.53777f$ |   |   |   |

| Lens Elements | Power of Refraction ($P_1$ to $P_{10}$) |
|---|---|
| 1 | Surface ($R_1$) $P_1=+1.01402/f$ |
|   | Surface ($R_2$) $P_2=-0.08312/f$ |
| 2 | Surface ($R_3$) $P_3=+1.79133/f$ |
|   | Surface ($R_4$) $P_4=-0.94283/f$ |
| 3 | Surface ($R_5$) $P_5=+0.72418/f$ |
| 4 | Surface ($R_6$) $P_6=-0.08691/f$ |
|   | Surface ($R_7$) $P_7=-3.17819/f$ |
|   | Surface ($R_8$) $P_8=+1.00262/f$ |
| 5 | Surface ($R_9$) $P_9=+0.01627/f$ |
| 6 | Surface ($R_{10}$) $P_{10}=-0.16049/f$ | wherein the first column lists six lens elements in numerals in order from the front to the rear; wherein $f$ is the focal length of the objective, $n_D$ is the index of refraction for the D line of the spectrum and $v$ is the dispersive index; and wherein R, $d$, and $l$ refer, respectively, to the radii of curvature of the refractive faces, the axial thicknesses of the lens elements, and the axial air spaces between the lens elements, the subscripts on the characters R, $d$, $l$, $n$ and $v$ being numbered consecutively from the front to the rear, and the plus and minus signs in the second column corresponding to refractive lens faces which are respectively convex and concave to the front.

9. A photographic tele-objective having an aperture of 1:2.8, an angle of field of 30°, and a rear intercept length of 0.34522f, the objective being constructed substantially according to the specifications in the following table:

| Lens Elements | Radii | Thicknesses and Airspaces | $n_D$ | V |
|---|---|---|---|---|
| 1 | $R_1=+0.60920f$ | $d_1=0.07246f$ | $n_1=1.62041$ | $v_1=60.3$ |
|   | $R_2=+5.99959f$ | $l_1=0.00082f$ |   |   |
| 2 | $R_3=+0.33517f$ | $d_2=0.05438f$ | $n_2=1.62041$ | $v_2=60.3$ |
|   | $R_4=+0.63881f$ | $l_2=0.03891f$ |   |   |
| 3 | $R_5=+0.68151f$ | $d_3=0.14321f$ | $n_3=1.51009$ | $v_3=63.4$ |
| 4 | $R_6=-2.42845f$ | $d_4=0.01294f$ | $n_4=1.72825$ | $v_4=28.3$ |
|   | $R_7=+0.22177f$ | $l_3=0.21396f$ |   |   |
| 5 | $R_8=+0.69730f$ | $d_5=0.02589f$ | $n_5=1.72340$ | $v_5=38.0$ |
|   | $R_9=+0.36838f$ | $d_6=0.08630f$ | $n_6=1.72825$ | $v_6=28.3$ |
| 6 | $R_{10}=+6.24337f$ |   |   |   | wherein the first column lists six lens elements in numerals in order from the front to the rear; wherein $f$ is the focal length of the objective, $n_D$ is the index of refraction for the D line of the spectrum and $v$ is the dispersive index; and wherein R, $d$, and $l$ refer, respectively, to the radii of curvature of the refractive faces, the axial thickness of the lens elements, and the axial air spaces between the lens elements, the subscripts on the characters R, $d$, $l$, $n$ and $v$ being numbered consecutively from the front to the rear, and the plus and minus signs in the second column corresponding to refractive lens faces which are respectively convex and concave to the front.

10. A photographic tele-objective having an aperture of 1:2.8, an angle of field of 30°, and a rear intercept length of 0.35485f, the objective being constructed substantially according to the specification in the following table:

| Lens Elements | Radii | Thicknesses and Airspaces | $n_D$ | V |
|---|---|---|---|---|
| 1 | $R_1=+0.60000f$ | $d_1=0.07225f$ | $n_1=1.62041$ | $v_1=60.3$ |
|   | $R_2=+4.86946f$ | $l_1=0.00080f$ |   |   |
| 2 | $R_3=+0.33332f$ | $d_2=0.05812f$ | $n_2=1.62041$ | $v_2=60.3$ |
|   | $R_4=+0.62893f$ | $l_2=0.03492f$ |   |   |
| 3 | $R_5=+0.66990f$ | $d_3=0.14289f$ | $n_3=1.50378$ | $v_3=66.7$ |
| 4 | $R_6=-2.37005f$ | $d_4=0.01298f$ | $n_4=1.71736$ | $v_4=29.5$ |
|   | $R_7=+0.21728f$ | $l_3=0.21341f$ |   |   |
| 5 | $R_8=+0.66498f$ | $d_5=0.02584f$ | $n_5=1.71020$ | $v_5=36.5$ |
|   | $R_9=+0.45206f$ | $d_6=0.07466f$ | $n_6=1.72825$ | $v_6=28.3$ |
| 6 | $R_{10}=+4.72522f$ |   |   |   | wherein the first column lists six lens elements in numerals in order from the front to the rear; wherein $f$ is the focal length of the objective, $n_D$ is the index of refraction for the D line of the spectrum and $v$ is the dispersive index; and wherein R, $d$, and $l$ refer, respectively, to the radii of curvature of the refractive faces, the axial thicknesses of the lens elements, and the axial air spaces between the lens elements, the subscripts on the characters R, $d$, $l$, $n$ and $v$ being numbered consecutively from the front to the rear, and the plus and minus signs in the second column corresponding to refractive lens faces which are respectively convex and concave to the front.

References Cited in the file of this patent

UNITED STATES PATENTS

| | | |
|---|---|---|
| 1,085,868 | Konig | Feb. 3, 1914 |
| 1,899,934 | Berek | Mar. 7, 1933 |
| 2,100,291 | Lee | Nov. 23, 1937 |
| 2,171,274 | Merte | Aug. 29, 1939 |
| 2,184,018 | Ort | Dec. 19, 1939 |
| 2,350,035 | Herzberger | May 30, 1944 |
| 2,767,614 | Altman | Oct. 23, 1956 |
| 2,803,167 | Kohler et al. | Aug. 20, 1957 |
| 2,913,956 | Solish | Nov. 24, 1959 |

FOREIGN PATENTS

| | | |
|---|---|---|
| 696,167 | Great Britain | Aug. 26, 1953 |
| 719,677 | Germany | Apr. 18, 1942 |